Patented Dec. 21, 1943

2,337,521

UNITED STATES PATENT OFFICE 2,337,521

CERAMIC

Hugh S. Cooper, New York, N. Y., assignor to Cooper-Wilford Beryllium, Ltd., Philadelphia, Pa., a corporation of Delaware No Drawing. Application November 28, 1940, Serial No. 367,621

2 Claims. (Cl. 106—48)

This invention relates to a novel composition of matter, useful as a solid ceramic body, enamel, glaze, or the like.

An object of this invention is to provide a strong and tough ceramic body.

Another object is to provide a vitreous or glass-like ceramic material that is free from pores and impervious to liquids.

A further object is to provide a ceramic material of relatively low melting point that is not highly viscous in the melted condition, and can readily be cast into any desired shape.

Still another object is to provide a ceramic material that can be applied as a coating to other bodies and then converted to a glaze or enamel by subsequent heating.

Other objects of the invention will be apparent from the following specification.

The material of the present invention consists of a fused mixture of the mineral beryl and calcium fluoride. Beryl is a common ore of beryllium and is a double silicate of beryllium and aluminum. In the pure state its composition corresponds closely to the formula $Al_2O_3(BeO)_3(SiO_2)_6$. Its melting point is about 1500° C. or higher, depending on its purity.

For the purposes of this invention the beryl is ground very fine, to about 200 mesh. It is then thoroughly blended with calcium fluoride equally finely ground. Instead of artificially produced calcium fluoride the native material fluorspar can be used. After being thoroughly mixed the two ingredients are placed in a container such as a graphite crucible, and heated in any suitable furnace.

When the two ingredients are present in about equal parts the mixture melts at about 1000° C. to a thin liquid. This is far below the melting point of either ingredient and is about the lowest melting point of the system. When the proportion is two parts of calcium fluoride to one part of beryl the melting point is about 1250° C. The liquid formed by melting may be cast into any desired shape. On cooling it produces a tough strong vitreous body which has a highly glazed exterior. The fracture is very dense, though not as highly glazed as the exterior, and the material is impervious to liquids. In color it is a pleasing shade between gray and tan, sometimes showing striations of other colors and having somewhat the appearance of agate.

The fused mixture instead of being cast into the desired shape can be pulverized, either directly, or preferably by running the melt into water and grinding the resultant frit. The powder is then mixed with a little water which may contain a suitable binder and moulded into any desired shape. The moulded articles are then heated moderately, to about 800° C., and thereby sintered into hard, strong, solid bodies. The powdered frint is particularly adapted to sintering because it softens very materially at about 750° C.

The powdered frit mixed with water with or without a binder can also be applied as a coating to other bodies, and baked on to form a glaze or enamel.

The color of the material of this invention is relatively light, particularly if fairly pure ingredients are used. As a result it can be brought to almost any desired color by adding suitable coloring materials, such as are known and commonly used in ceramics, glass and enamel.

The material of the present invention can be used for all manner of electrical insulators and insulating bodies, and for many of the purposes now fulfilled by porcelain, glass, enamel, and ceramics generally. It has the advantages that it can be cast at a relatively low temperature, and sintered at still lower temperatures in which respect it excels the common ceramics and approaches the plastics. It has of course the accompanying limitation of low strength at high temperature. The material of the present invention takes on many of the properties described herein when either of the ingredients is present to the extent of as little as five percent.

I claim as my invention:

1. A composition of matter comprising a fused mixture of beryl and calcium fluoride.

2. A composition of matter comprising a fused mixture of beryl and calcium fluoride, in which the beryl is from five percent to ninety-five percent of the whole, and the calcium fluoride is from ninety-five percent to five percent of the whole, both by weight.

HUGH S. COOPER.